(12) United States Patent
Hisashi et al.

(10) Patent No.: US 12,435,208 B2
(45) Date of Patent: Oct. 7, 2025

(54) CARBON MATERIAL GRANULATED PRODUCT, METHOD FOR PRODUCING CARBON MATERIAL GRANULATED PRODUCT, AND CONDUCTIVE RESIN COMPOSITION

(71) Applicant: DR. GOO Co., Ltd., Oita (JP)

(72) Inventors: Hideyuki Hisashi, Oita (JP); Noritaka Sakuta, Tokyo (JP); Ryosuke Takamiya, Tokyo (JP)

(73) Assignee: DR. GOO Co., Ltd. (JP)

( * ) Notice: Subject to any disclaimer, the term of this patent is extended or adjusted under 35 U.S.C. 154(b) by 0 days.

(21) Appl. No.: 18/834,144

(22) PCT Filed: Dec. 27, 2022

(86) PCT No.: PCT/JP2022/048066
§ 371 (c)(1),
(2) Date: Jul. 29, 2024

(87) PCT Pub. No.: WO2023/149136
PCT Pub. Date: Aug. 10, 2023

(65) Prior Publication Data
US 2025/0109278 A1   Apr. 3, 2025

(30) Foreign Application Priority Data

Feb. 1, 2022  (JP) ................ 2022-014386

(51) Int. Cl.
| C08K 9/08 | (2006.01) |
| C09C 1/58 | (2006.01) |
| C09C 3/00 | (2006.01) |
| C09C 3/04 | (2006.01) |
| C09C 3/10 | (2006.01) |

(52) U.S. Cl.
CPC .............. C08K 9/08 (2013.01); C09C 1/58 (2013.01); C09C 3/006 (2013.01); C09C 3/041 (2013.01); C09C 3/045 (2013.01); C09C 3/10 (2013.01); *C01P 2004/01* (2013.01); *C01P 2004/50* (2013.01); *C01P 2004/61* (2013.01); *C01P 2006/40* (2013.01); *C08K 2201/001* (2013.01)

(58) Field of Classification Search
CPC .. C08K 9/08; C09C 1/58; C09C 3/006; C09C 3/041; C09C 3/045; C09C 3/10
See application file for complete search history.

(56) References Cited

U.S. PATENT DOCUMENTS

| 9,530,569 B2 * | 12/2016 | Naito | ............ H01G 9/0036 |
| 2010/0117031 A1 * | 5/2010 | Akagi | ............ H01M 4/0471 |
| | | | 252/182.1 |
| 2010/0189625 A1 * | 7/2010 | Hisashi | ............ B82Y 30/00 |
| | | | 423/447.2 |
| 2010/0248034 A1 | 9/2010 | Oki et al. | |
| 2013/0082214 A1 * | 4/2013 | Sharaby | ............ C09K 3/1012 |
| | | | 252/511 |
| 2021/0262159 A1 * | 8/2021 | Fang | ............ D06M 11/74 |
| 2022/0013777 A1 * | 1/2022 | Nagai | ............ H01M 10/0525 |
| 2022/0315730 A1 * | 10/2022 | Yamamoto | ............ C08K 3/041 |
| 2023/0159724 A1 * | 5/2023 | Chen | ............ C08K 3/36 |
| | | | 524/495 |
| 2025/0092265 A1 * | 3/2025 | Rumpf | ............ C09C 1/58 |

FOREIGN PATENT DOCUMENTS

| JP | 2009-176721 A | 8/2009 |
| JP | 2010-202751 A | 9/2010 |
| JP | 2014-122264 A | 7/2014 |
| JP | 2016-108524 A | 6/2016 |
| JP | 2017-201006 A | 11/2017 |
| JP | 6714134 B1 | 6/2020 |
| JP | 2020-176186 A | 10/2020 |
| WO | 2015/064708 A1 | 5/2015 |

OTHER PUBLICATIONS

Product Description "Denka Black" obtained online Feb. 2025. (Year: 2025).*
Clarivate Analytics machine translation JP 2017201006 A to HISA, published Nov. 9, 2017 (Year: 2017).*
Seiji Maeno, The structure and characteristics of conductive carbon black "Ketjenblack EC", Tanso (carbon), 2006, vol. 2006, No. 222, pp. 140 to 146.
Hideyuki Hisashi, "Carbon Black and Functional Carbon Black", Journal of The Society Rubber Industry, Japan, vol. 73, No. 7, Jul. 2000, pp. 362 to 370.
International Search Report of the International Searching Authority, issued in PCT/JP2022/048066, mailed Jan. 31, 2023; ISA/JP (5 pages).
International Preliminary Report on Patentability with Written Opinion issued in the corresponding International Patent Application No. PCT/JP2022/048066; dated Aug. 6, 2024 (total 8 pages).

* cited by examiner

*Primary Examiner* — Jane L Stanley
(74) *Attorney, Agent, or Firm* — Harness, Dickey & Pierce, P.L.C.

(57) ABSTRACT

A carbon material granulated product contains a carbon black having a particle size $D_{50}$, as determined by a laser diffraction/scattering method specified in ISO 13320, of 250 µm or less, a carbon nanotube having a particle size $D_{50}$, as determined by the laser diffraction/scattering method specified in ISO 13320, of 50 µm or less, and a solvent-soluble polymer impregnated into the carbon black and the carbon nanotube. In the carbon material granulated product, the solvent-soluble polymer is at least one selected from the group consisting of ether polymers, vinyl polymers, amine polymers, cellulose polymers, and starch polymers, and the content of the solvent-soluble polymer is in a range from 1 part by mass to 15 parts by mass relative to a total content of the carbon black and the carbon nanotube taken as 100 parts by mass.

2 Claims, 7 Drawing Sheets

CARBON MATERIAL GRANULATED PRODUCT, METHOD FOR PRODUCING CARBON MATERIAL GRANULATED PRODUCT, AND CONDUCTIVE RESIN COMPOSITION

CROSS REFERENCE TO RELATED APPLICATIONS

This application is a 371 U.S. National Phase of International Application No. PCT/JP2022/048066, filed on Dec. 27, 2022, which claims priority to Japanese Patent Application No. 2022-014386, filed Feb. 1, 2022. The entire disclosures of the above applications are incorporated herein by reference.

TECHNICAL FIELD

The present invention relates to a carbon material granulated product, a method for producing a carbon material granulated product, and a conductive resin composition.

BACKGROUND ART

Various studies have recently been made on impartment of conductivity or antistatic properties to resin compositions. For example, a tray or carrier tape formed of a thermoplastic resin is known as a packaging material for an electronic device component including an IC or LSI. However, ordinary resin molded articles have no conductivity and have high surface resistivities and high volume resistivities. This may cause a problem such as dielectric breakdown of an electronic component due to electrification or functional decline due to dust adhesion. To prevent this, various kinds of materials are added to attempt to solve the problem. In particular, many studies have been made to impart antistatic properties or electrostatic diffusion properties by blending, for example, a carbon black (hereinafter also referred to as a CB) or a carbon nanotube (hereinafter also referred to as a CNT). As a carbon black for imparting conductivity, what is generally called a conductive carbon black, such as Ketjenblack, acetylene black, or furnace black, is often blended. Of these, Ketjenblack has been widely used because it can achieve high conductivity with the smallest amount added.

However, Ketjenblack as well as other carbon blacks, if blended in an increased amount, may increase melt viscosity, making it difficult to perform molding processing by injection molding or the like. Another problem is that a molded article poor in mechanical properties such as impact strength is provided. In addition, even if higher conductivity is desired, there is a physical upper limit to the amount of carbon black blended, which may present a problem in that there is a restriction on the volume resistivity (hereinafter also referred to as VR) to be achieved. Carbon blacks are produced by incomplete combustion or thermal decomposition of hydrocarbons. Methods for producing carbon blacks are divided into a thermal process, an acetylene decomposition process, a contact process, and a furnace process, depending on the type of a hydrocarbon used as a raw material. The basic nature of carbon blacks is the particle size, the structure which is a state of connection of particles, and the physicochemical properties of a particle surface, which are called the three major properties. In general, the desired quality of a conductive carbon black is said to be a small particle size (i.e., a large specific surface area), a large structure, and low surface physicochemical properties.

Carbon nanotubes have a structure in which a hexagonal mesh-like graphite sheet forms a cylinder with a diameter of about 1 nm to 200 nm and a length of about 0.1 µm to 2,000 µm. When this cylindrical graphite sheet is formed of a single layer, it is called a single-walled carbon nanotube (SWCNT), and when the cylindrical graphite sheet is formed of multiple layers, it is called a multi-walled carbon nanotube (MWCNT). In some carbon nanotubes, carbon nanotube fibers are primarily aggregated to be intertwined or form bundle-like primary aggregates, but in most carbon nanotubes, primary aggregates are aggregated to form secondary aggregates.

When a carbon nanotube with a specific surface area of about 150 $m^2/g$ or more is blended in a resin or the like, desired conductivity can be achieved with an amount smaller than that of Ketjenblack, and a compound superior to a carbon black compound in mechanical properties such as impact strength is provided. However, there are drawbacks such as (1) to (3) below.

(1) Less dispersible than carbon blacks.
(2) Highly likely to scatter during kneading, etc., thus presenting safety concerns.
(3) Five to ten times more expensive than standard conductive carbon blacks.

Examples of cases where CBs or other carbon materials are dispersed in thermoplastic resins include a conductive resin composition obtained by adding a conductive carbon material that is a CB or a CNT to polycarbonate and polyethylene terephthalate resins (Patent Literature 1); a conductive sheet containing a resultant of mixing of dispersion solutions of a carbon black and a carbon nanotube respectively obtained using an aqueous water-soluble xylan solution as a dispersant and acetone as a solvent, followed by separation by filtration, drying, and gentle grinding (Patent Literature 2); a method for obtaining an aggregate by adding a polydiallyldimethylammonium chloride polymer, which is a water-soluble polymer, to a CNT (Patent Literature 3); and evaluation of various carbon materials by adding them to a HDPE resin and measuring their volume resistivity (Non-Patent Literature 1). In Non-Patent Literature 2, FIG. 17, which shows the volume resistivity in the case where six CBs having specific surface areas between 50 $m^2/g$ and 1,500 $m^2/g$ are blended in a PVC resin, indicates that CBs having larger specific surface areas provide higher conductivity.

Furthermore, one example of a case where a mixture of a CB and a CNT is granulated is a method for producing a carbon granulated product, including a CNT dispersion step of dispersing a CNT having a particle size of 100 nm or less in water, a granulation step of performing granulation by mixing CB powder in a dispersion machine with a CNT dispersion solution obtained in the CNT dispersion step, and a drying step of drying a carbon granulated product obtained in the granulation step (Patent Literature 4).

CITATION LIST

Patent Literatures

Patent Literature 1: Japanese Unexamined Patent Application Publication No. 2010-202751
Patent Literature 2: International Publication No. 2015/064708
Patent Literature 3: Japanese Patent No. 6714134

Patent Literature 4: Japanese Unexamined Patent Application Publication No. 2017-201006

NON-PATENT LITERATURES

Non-Patent Literature 1: The structure and characteristics of conductive carbon black "KETJENBLACK EC", TANSO (carbon), 2006, Vol. 2006, No. 222, pp. 140 to 146
Non-Patent Literature 2: Carbon Black and Functional Carbon Black, Journal of The Society Rubber Industry, Japan, Vol. 73, No. 7 (July 2000, pp. 362 to 370)

Problems to be Solved by the Invention

In Patent Literature 1, a CB and a CNT are used as conductive carbon materials. However, in Patent Literature 1, a glass component or glass fiber is added to improve the strength of a resin composition, which is completely different from the intended effects or problems themselves in the invention. With regard to the method of mixing a CB and a CNT in Patent Literature 1, although paragraph of Patent Literature 1 states "dry-blended, then granulated with an extrusion granulator, a briquetting machine, or the like as necessary, and then melt kneaded and pelletized with a twin-screw extruder or the like.", in all Examples and Comparative Examples, after dry blending, pellets are obtained after melt kneading with a twin-screw kneader. In addition, in Patent Literature 1, the dry blending process does not include a grinding process, and a treatment of impregnating the CB and CNT mixture with a water-soluble polymer is not performed.

Patent Literature 2 describes that a composite paste made from a CNT dispersed in an aqueous xylan solution and a CB dispersed in acetone is dried to obtain a composite filler, which is blended in a resin or rubber to obtain a conductive material with excellent dispersibility. However, Patent Literature 2 does not describe that after the CB and the CNT are ground and mixed, the mixture is granulated using a water binder and then dried. Patent Literature 2 also does not describe a water-soluble polymer impregnation during granulation.

Patent Literature 3 relates to the production of an aggregate by adding a water-soluble polymer to a CNT, and there is no description of CB addition in Patent Literature 3. Under such circumstances, the inventors have found that combining a CB is not easily conceivable, which is the feature of the invention.

FIG. 3 of Non-Patent Literature 1 shows the relationship between the amount of various carbon blacks added to a HDPE resin and the volume resistivity. It can be seen that Ketjenblack exhibits conductivity with an amount smaller than that of acetylene black or a furnace-type conductive carbon black. Furthermore, it is observed that when the same amount is added, the following relationship is satisfied: Ketjenblack exhibits higher conductivity than furnace black, and furnace black exhibits higher conductivity than acetylene black. However, an increase in the amount of carbon black not only leads to an increase in melt viscosity of the resin, which makes it difficult to perform molding processing by injection molding or the like, but also leads to a decrease in mechanical properties such as impact strength. In addition, even if higher conductivity is desired, there is a physical upper limit to the amount of carbon black blended, and there is a limitation to the volume resistivity to be achieved. At the same time, there is no finding based on a combination of a CB and a CNT in Non-Patent Literature 1.

There is no finding based on a combination of a CB and a CNT also in Non-Patent Literature 2.

Patent Literature 4 is characterized in that instead of directly mixing and granulating CB powder and CNT powder, which readily scatter and are difficult to handle, a CNT dispersion solution is prepared by dispersing CNT powder, which is more hydrophobic, has a lower bulk density, and more readily scatters than CB powder, in water in advance, and then added as a granulation binder to the CB powder to obtain a dense granulated product in which the CB and the CNT are homogeneously mixed. Patent Literature 4 also describes that the water in which the CNT is to be dispersed contains 30% or less of a water-soluble organic solvent, and furthermore a surfactant or a water-soluble polymer is used as a dispersant. However, the water dispersion of CNT powder in Patent Literature 4 is performed using a media-type dispersion machine or an ultrasonic dispersion machine and using a powder refined down to below micro levels. In the dispersion in Examples, premixing is performed twice, i.e., primary premixing and secondary premixing, and then a final dispersion solution is obtained using a bead mill. This means that it takes several hours to several tens of hours to disperse the CNT powder, which is an extremely unproductive method of production. By contrast, in the invention, in order to mix CB powder and CNT powder in a homogeneous state, the CB powder and the CNT powder are mixed at the same time as they are, or the CB and the CNT are mixed in advance using a powder mixer and then subjected to a dry grinding process. The dry grinding process is a process in which the mixture of the CB and the CNT is passed through an ultrafine grinder such as a jet mill or a jet nanomizer to obtain a homogeneous mixture in the form of being ground down to micro levels to nano levels. Furthermore, another purpose of the ultrafine grinding treatment before granulation is to turn a granular product (granulated product), which is the usual form of commercially available CBs and CNTs, into powder. Particularly in recent years, most brands of CBs and CNTs are granulated to be in granular form for reduction in transportation costs, ease of handling by end users, and higher safety, and are worse than powdery products in terms of dispersibility. Furthermore, even in a few powdery products remaining as commercially available products, a few percent of granular products formed on production lines are present, and these granular products are preferably ground from the viewpoint of dispersibility. The above-mentioned dry grinding process is suitable also as this treatment.

An object of the invention is to provide a carbon material granulated product that can reduce scattering properties and can improve conductivity and mechanical properties, a method for producing a carbon material granulated product, and a conductive resin composition.

SUMMARY

Thus, the invention provides a carbon material granulated product, a method for producing a carbon material granulated product, and a conductive resin composition described below.

[1] A carbon material granulated product containing a carbon black having a particle size $D_{50}$, as determined by a laser diffraction/scattering method specified in ISO 13320, of 250 μm or less, a carbon nanotube having a particle size $D_{50}$, as determined by the laser diffraction/scattering method specified in ISO 13320, of 50 μm or less, and a solvent-soluble polymer impregnated into the carbon black and the carbon nanotube, in which the solvent-soluble polymer is at least one selected from the group consisting of ether polymers, vinyl polymers, amine polymers, cellulose polymers, and starch polymers, and a content of the solvent-soluble polymer is in a range from 1 part by mass to 15 parts by mass relative to a total content of the carbon black and the carbon nanotube taken as 100 parts by mass.

[2] The carbon material granulated product according to [1], in which an amount of hydrogen desorbed from the carbon black, as quantitatively determined by pressure reduction to a range from $10^2$ mmHg to $10^{-2}$ mmHg, followed by heating at 1,500 degrees C. for 30 minutes, and gas chromatography, is 2 mg/g or less.

[3] A method for producing a carbon material granulated product, including dry grinding and mixing a granular carbon black and a granular carbon nanotube so that the carbon black has a particle size $D_{50}$, as determined by a laser diffraction/scattering method specified in ISO 13320, of 250 µm or less and the carbon nanotube has a particle size $D_{50}$, as determined by the laser diffraction/scattering method specified in ISO 13320, of 50 µm or less to obtain a mixture, preparing a binder solution by dissolving a solvent-soluble polymer in a solvent, and performing mixing and granulation while adding the binder solution to the mixture to obtain a carbon material granulated product, in which the solvent-soluble polymer is at least one selected from the group consisting of ether polymers, vinyl polymers, amine polymers, cellulose polymers, and starch polymers, and a content of the solvent-soluble polymer impregnated into the carbon black and the carbon is in a range from 1 part by mass to 15 parts by mass relative to a total content of the carbon black and the carbon nanotube taken as 100 parts by mass.

[4] A conductive resin composition containing the carbon material granulated product according to [1] or [2] and a resin, in which the resin is at least one selected from the group consisting of polyolefin resins, polyhalogenated olefin resins, polyester resins, polyamide resins, polyimide resins, polyether resins, polyvinyl resins, polystyrene resins, polyvinyl alcohol resins, polymethacrylate resins, polyurethane resins, polyepoxy resins, polyphenol resins, polyurea resins, and polyethersulfone resins.

According to the invention, a carbon material granulated product that can reduce scattering properties and can improve conductivity and mechanical properties, a method for producing a carbon material granulated product, and a conductive resin composition can be provided.

DETAILED DESCRIPTION

Figure 1:
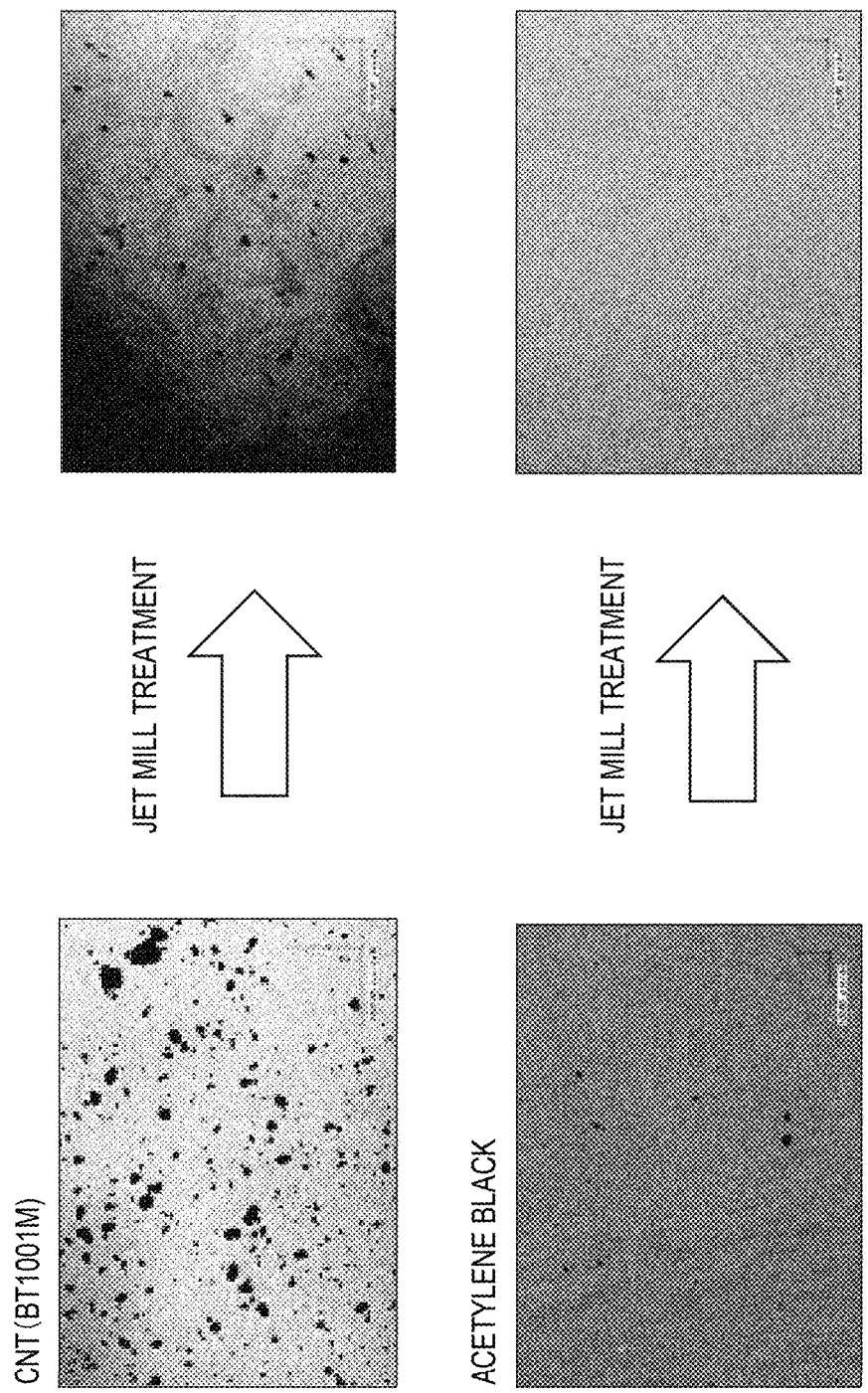
FIG. 1 shows images showing the dispersibility of resin compositions before and after grinding of a CB and a CNT obtained in Test Example 1.

Hereinafter, exemplary embodiments of the invention will be described, but the following exemplary embodiments are not intended to limit the invention. Hereinafter, a carbon material granulated product is also referred to simply as a "granulated product".

Carbon Material Granulated Product

First, a carbon material granulated product according to an exemplary embodiment will be described.

The granulated product according to the exemplary embodiment contains a CB with a specific particle size or smaller, a CNT with a specific particle size or smaller, and a solvent-soluble polymer impregnated into the CB and the CNT.

The reason why the exemplary embodiment provides a carbon material granulated product that can reduce scattering properties and can improve conductivity and mechanical properties is not necessarily clear, but the inventors presume as follows.

First, the reason why the scattering properties can be reduced is presumably as follows. That is, when both a CB and a CNT are powders or dry granules, they readily scatter, but in the exemplary embodiment, the solvent-soluble polymer is impregnated into the CB and the CNT to cover the surface and other parts of the carbon material granulated product. This prevents the CB and the CNT from being separated into individual powders. Thus, also when the carbon material granulated product is mixed with a resin or the like, the scattering properties can be reduced, and problems such as a decrease in safety and a decrease in workability can be prevented.

Of CBs and CNTs, CNTs in particular have the disadvantage of being poorly dispersible when mixed with a resin or the like. Thus, a problem may arise in that the carbon material granulated product cannot sufficiently improve conductivity and mechanical properties. By contrast, in the exemplary embodiment, since the particle sizes of the CB and the CNT are adjusted to specific sizes or smaller, a homogeneous mixture is provided. The impregnation of a solvent-soluble polymer into such a CB and a CNT allows the CB and the CNT to be dispersed well when mixed with a resin or the like.

Thus, the carbon material granulated product can sufficiently improve conductivity and mechanical properties.

A CB that, when blended as a conductive carbon black in a resin or the like, causes the largest decrease in resistivity per blending amount, that is, provides highest conductivity, is Ketjenblack. However, when Ketjenblack is blended at a high concentration so as to achieve a low VR, mechanical properties, particularly impact strength, are considerably reduced. CNTs are considered to be one of the most suitable materials that can ensure conductivity and further improve mechanical properties. However, CNTs suffer from the drawback that they are difficult to disperse when blended in a resin or the like. In addition, CNTs scatter much during handling because they have lower bulk specific gravity than CBs. Thus, CNTs are said to have a safety concern. Furthermore, CNTs suffer from the drawback that they also have cost issues.

As a means for improving these issues, the inventors have attempted to mix a CB and a CNT. This can improve mechanical properties. In the exemplary embodiment, the solvent-soluble polymer is impregnated into the CB and the CNT. This prevents the CB and the CNT from being separated into individual powders. Thus, also when the carbon material granulated product is mixed with a resin or the like, the scattering properties can be reduced, and problems such as a decrease in safety and a decrease in workability can be prevented.

The reason why the conductivity can be improved is presumably as follows. That is, the mechanism by which conductivity is exhibited when a CB is blended is generally explained using the percolation phenomenon or the tunneling phenomenon ("tunneling" effect due to jumping of IT electrons). According to these theories, the points for efficient formation of conductive circuits are (1) to (5) below.

(1) Small particle size
(2) Large surface area
(3) Highly developed structure
(4) Developed crystal structure
(5) Few impurities that trap TT electrons The mixture according to the exemplary embodiment is considered to be related particularly to (3), (4), and (5), but before discussing the mechanism by which conductivity is exhibited, what is important is how to make a CB itself a conductor. CBs are materials that are electrically conductive due to the movement of IT electrons on crystallite planes of the particle surface, and thus the development of crystallites leads to easier movement of IT electrons and is preferred for conductors. In addition, the treatment to develop crystallites can reduce even impurities in the interior and on the surface of particles, and thus is preferred also in this respect. What are called impurities in the conductive CB genre include hydrogen and oxygen forming functional groups on the particle surface, sulfur, and undecomposed raw hydrocarbons (PAH), and hydrogen and oxygen most influence conductivity. These are present in the forms of a carboxy group, a hydroxy group, a carbonyl group, a phenolic hydroxy group, and hydrogen at a benzene ring end, etc., among which the carboxy group and hydrogen greatly influence conductivity.

In the exemplary embodiment, the carbon nanotube mixed with the carbon black has a fiber diameter of 3 nm to 50 nm, a fiber length on the order of 0.1 µm to 2,000 µm, a developed crystal structure, and, furthermore, a fiber surface with few functional groups, which is a favorable surface for a conductor. In addition, the carbon nanotube has a fiber that is several times to several hundred times longer than the length of the structure of the carbon black. The inventors presume that the reason why the mixture blended with the CB exhibits higher-than-expected conductivity is that the three-dimensional structural network is expanded compared with when they are separated from each other and that TT-electron jumps (tunneling effect) from the fibers forming the ends of the network are increased.

Carbon Material

Carbon materials used in the exemplary embodiment are a CB having a particle size $D_{50}$ of 500 µm or less and a CNT having a particle size $D_{50}$ of 100 µm or less.

The particle size $D_{50}$ of the CB and the CNT can be measured by a laser diffraction/scattering method, which will be described in detail later.

The CB may be an appropriate known one, and it has been found that CBs with smaller amounts of hydrogen on CB particle surfaces are more excellent in conductivity.

The amount of hydrogen is measured by a method called vacuum pyrolysis, which is based on the study by Barton et al. Specifically, about 0.5 g of a dried CB is accurately weighed and then placed in a heat-resistant test tube, and after the pressure is reduced to a medium vacuum ($10^2$ Pa to $10^{-2}$ Pa) or lower, the test tube is charged into an electric furnace and heated at 1,500 degrees C. for 30 minutes, and hydrogen gas desorbed from the CB surface is quantitatively determined by gas chromatography.

The amount of hydrogen determined in this manner is preferably 2 mg/g or less, more preferably 1.5 mg/g or less, and still more preferably 1 mg/g or less.

Regarding the reason why the conductivity of the carbon material granulated product can be further improved when the amount of hydrogen at 1,500 degrees C. is equal to or less than the above upper limit, the inventors presume as follows.

Specifically, when the mechanism by which conductivity is exhibited by a single carbon material including a CB is explained by the percolation theory, functional groups such as a carboxy group, a hydroxy group, a carbonyl group, and hydrogen on the carbon black surface are present. The functional groups of a carbon nanotube are mainly hydrogen, but the amount thereof is very small; thus, the functional groups of a mixture of a CB and a CNT can be considered to be mostly functional groups derived from the carbon black. Hydrogen serves as a barrier when IT electrons move. Therefore, for a conductive CB, the amount of hydrogen is said to be preferably as small as possible. However, when a CB alone is added to a resin, there is no correlation between the conductivity and the amount of hydrogen. In addition, no studies have been conducted on whether hydrogen in functional groups has an influence in a mixture of a CB and a CNT.

Figure 3:
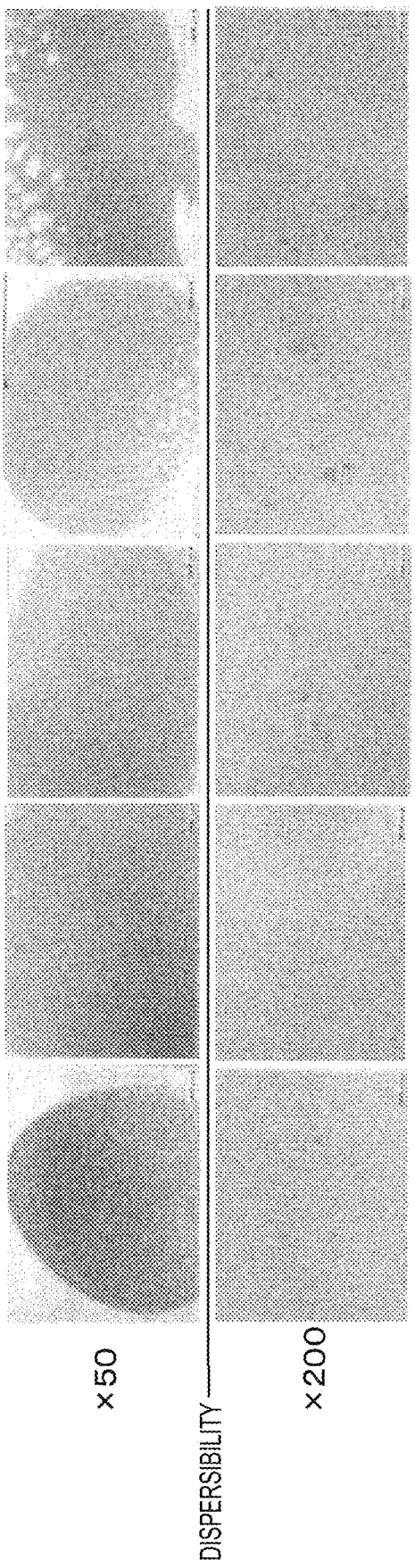
FIG. 3 shows images showing the dispersibility of resin compositions with varied solvent-soluble polymers obtained in Test Example 4.

When a CB alone is blended in a resin, although the effectiveness of volume resistivity depending on the type of CB is clearly ranked in FIG. 3 of Non-Patent Literature 1, there is no correlation with the amount of hydrogen specific to each CB. Meanwhile, the inventors have found that when a CNT and a CB are mixed, the volume resistivity does not show the same tendency as when the CB alone is blended in a resin, that is, the conductivity in the case of a mixture cannot be assumed from the conductivity in the case of the CB alone. Thus, it has been found that the amount of hydrogen on a CB surface determined by performing heating at 1,500 degrees C. is more greatly involved than the above-mentioned characteristics generally said to be desirable for conductive CBs (small particle size, long structure, etc.), and that a slight difference in the amount of hydrogen at 1,500 degrees C. results in a difference in volume resistivity of about six orders of magnitude when blended in a resin. Not only the specific surface area or structure formation, the smaller the amount of hydrogen specific to a CB selected, the lower the volume resistivity after mixing with a CNT. From this finding, the inventors presume that the selection of a CB to achieve expected conductivity will provide required higher conductive performance.

Next, CNTs preferred as conductive materials will be described. The points of preferred CNTs are (1) to (5) below.

(1) Small fiber diameter
(2) Large specific surface area
(3) Appropriate fiber length (according to one theory, several µm to several tens of µm)
(4) Developed crystallite and few functional groups
(5) Few impurities such as catalysts The points of preferred CNTs are to have the properties and characteristics as listed above, but since generally available CNTs are limited, how to use them is currently a technique. As listed in (4), the amount of functional groups, particularly the amount of hydrogen, influences conductivity also in CNTs, but the amount of hydrogen is very small in CNTs because of their developed crystal structure. Therefore, the functional groups of a mixture of a CB and a CNT can be considered to be mostly hydrogen functional groups derived from the CB. Hydrogen serves as a barrier when π electrons move. Therefore, for a conductive carbon black, the amount of hydrogen is said to be preferably as small as possible.

However, as described later, when a CB alone is added to a resin, there is no correlation between the conductivity and the amount of hydrogen. In addition, no studies have been conducted on whether hydrogen in functional groups has an influence in a mixture of a CB and a CNT.

Examples of CBs include those obtained by a thermal decomposition method such as a thermal method or an acetylene decomposition method, those obtained by an incomplete combustion method such as an oil furnace method, and those obtained by a heavy oil gasification process such as the Texas method, the Fauser method, or the Shell method. These may be used alone or as a mixture of two or more.

Specific examples include #4000 and #5000 series manufactured by Tokai Carbon Co., Ltd., #3000 series manufactured by Mitsubishi Chemical Corporation, FX, HS, DENKA BLACK, etc. manufactured by Denka Company Limited, Conductex series manufactured by Birla Carbon, Vulcan series and LITX series manufactured by Cabot Corporation, ENSACO series and Super P-Li series manufactured by Imerys GC, and Printex L manufactured by Orion Engineered Carbons.

For a CNT, the fiber diameter is 0.3 nm, which is producible with modern technology, but may be smaller than 0.3 nm. As the fiber diameter increases beyond 50 nm, the electrical and mechanical properties tend to decrease, and when the fiber diameter is larger than 100 nm, the CNT tends to lose its advantage over CBs, carbon nanofibers, and the like.

In the granulated product according to the exemplary embodiment, for the CNT to efficiently form a three-dimensional structural network, the fiber diameter of the CNT is more preferably in a range from 3 nm to 50 nm, still more preferably in a range from 5 nm to 40 nm, and particularly preferably in a range from 10 nm to 30 nm.

The fiber length of the CNT is related to conductivity, mechanical properties, or dispersibility. The fiber length of the CNT is preferably in a range from 0.1 μm to 2,000 μm, more preferably in a range from 1 μm to 1,000 μm. As the fiber length decreases, conductivity and mechanical properties tend to be less easily exhibited, and as the fiber length increases, not only mal-dispersed clumps increase due to stronger fiber entanglement, but also fiber breakages increase during dispersion by kneading, which are unfavorable tendencies.

The aspect ratio of the CNT is about 10 to 10,000. As the CNT, a structure in which a hexagonal mesh-like graphite sheet forms a cylinder is suitable for use. The CNT may be a single-walled CNT or a multi-walled CNT, either of which can be chosen depending on the intended end use. The method for producing the CNT is also not limited. The method for producing the CNT is exemplified by a thermal decomposition method in which carbon-containing gas is brought into contact with a catalyst, an arc discharge method in which an arc discharge is generated between carbon rods, a laser vaporization method in which a carbon target is irradiated with a laser beam, a CVD method in which a carbon source gas is allowed to react at high temperature in the presence of metal fine particles, and the HiPco method in which carbon monoxide is decomposed under high pressure. The CNT may also be doped with metal atoms.

In the granulated product according to the exemplary embodiment, the content of the CNT is preferably in a range from 5 mass % to 40 mass %, more preferably in a range from 10 mass % to 35 mass % relative to the total content of the CB and the CNT taken as 100 mass %.

When the content of the CNT is not higher than the above upper limit, the dispersibility of the CNT can be improved. When the content of the CNT is not lower than the above lower limit, the conductivity can be further improved.

In the invention, it is essential to grind the CB and the CNT after mixing of the CB and the CNT and before a series of steps of impregnation of the solvent-soluble polymer and granulation. Recently, most available CNT products are in granular form for preventing scattering, reducing transportation costs, improving workability during processing, and other purposes. As a result, CNTs, which are difficult to disperse even in powder form, have become even more difficult to disperse. Among furnace-type CBs, CBs called conductive CBs are provided almost one hundred percent as granulated products, which are CBs that are clearly more difficult to disperse than powdery products. As a result of various studies on how to improve the dispersibility, it has been found that the dispersibility is improved by performing a grinding treatment. The grinding method is a method in which energy is applied to a material as a "compressive", "impact", "frictional", "shear", or other force so that stress is created in the material to deform and break it to be finer. The grinding may be performed by a dry process or a wet process, but in the invention, the grinding is preferably performed by the dry process.

Solvent-Soluble Polymer

The solvent-soluble polymer used in the exemplary embodiment is impregnated into the CB and the CNT.

Carbon nanotubes have poor workability due to their low bulk density, and are also said to have a safety concern because environmental pollution may occur due to their scattering properties. To solve these problems, the solvent-soluble polymer is impregnated into the CNT and the CB in the exemplary embodiment.

Any solvent-soluble polymer can be used as long as it is soluble in solvents such as water, organic solvents, and mixtures thereof. Examples of the solvent-soluble polymer include polymeric surfactants and high polymers.

Examples of surfactants include anionic surfactants, cationic surfactants, nonionic surfactants, and amphoteric surfactants. These may be used alone or as a mixture of two or more.

Examples of high polymers include ether polymers (e.g., polyethylene glycol (polyethylene oxide) and polypropylene glycol), vinyl polymers (e.g., polyvinyl alcohol, polyvinyl acetate, and polyvinylpyrrolidone), acrylamide polymers (e.g., polyacrylamide), amine polymers (e.g., polyethyleneimine and polybutyleneimine), cellulose polymers (e.g., methylcellulose, ethylcellulose, carboxymethylcellulose, hydroxyethylcellulose, and hydroxypropylmethylcellulose), and starch polymers (e.g., oxidized starch and gelatin). These may be used alone or as a mixture of two or more. Of these, from the viewpoint of reducing scattering properties or improving dispersibility, glycol polymers are more preferred, and polyethylene oxide is particularly preferred.

In the granulated product according to the exemplary embodiment, the content of the solvent-soluble polymer is preferably in a range from 1 part by mass to 30 parts by mass, more preferably in a range from 3 parts by mass to 15 parts by mass relative to the total content of the carbon black and the carbon nanotube taken as 100 parts by mass.

Carbon Material Granulated Product

The granulated product according to the exemplary embodiment is a granulated product formed of a mixture of the CB, the CNT, and the solvent-soluble polymer. The shape of the granulated product is preferably spherical.

The particle size of the granulated product is preferably in a range from 0.1 mm to 5 mm, more preferably in a range from 0.3 mm to 3 mm. As the particle size of the granulated product decreases below 0.3 mm, the fluidity from a hopper or the like tends to decrease, resulting in an increased amount of scattering of the CNT, etc. in the use environment. As the particle size of the granulated product increases beyond 3 mm, the granulated product tends to become difficult to be micronized or crushed during kneading with or dispersion in a synthetic resin or the like, resulting in undesirable mal-dispersion. In particular, when the particle size of the granulated product is smaller than 0.1 mm, or the particle size is larger than 5 mm, these tendencies are undesirably strong. The particle size of the granulated product can be determined by placing the granulated product together with a measure and observing them with a light microscope.

The hardness of the granulated product is preferably in a range from 5 g/granule to 20 g/granule, more preferably in a range from 10 g/granule to 15 g/granule. As the hardness increases beyond 15 g/granule, not only the initial dispersibility but also the final dispersibility tends to be worse when the granulated product is blended and dispersed in a synthetic resin or in rubber, water, a solvent, and a vehicle. As the hardness decreases below 10 g/granule, powdering tends to occur during packaging, transportation, storage, blending and kneading, etc., resulting in undesirable environmental pollution. In particular, when the hardness is lower than 5 g/granule or higher than 20 g/granule, these tendencies are undesirably strong. The hardness of the granulated product can be measured in accordance with JIS K 6219-3.

The hardness of the granulated product can be controlled by, for example, changing the type of the solvent-soluble polymer. From the viewpoint of controlling the hardness of the granulated product within the above range, the solvent-soluble polymer is preferably a glycol polymer, particularly preferably polyethylene oxide.

Method for Producing Carbon Material Granulated Product

Next, a method for producing a granulated product according to an exemplary embodiment will be described.

Although there are somewhat different matters in specific implementation, the method for producing a granulated product according to the exemplary embodiment is basically a method including a step of finely grinding a granular CNT and a granular CB by a dry process and mixing them in an inert atmosphere (grinding and mixing step), a step of preparing a binder solution by dissolving a solvent-soluble polymer in a solvent (solution preparation step), and a step of performing mixing while adding the binder solution portionwise to the mixture of the CB and the CNT to obtain a carbon material granulated product (granulated product preparation step).

According to the method for producing a granulated product according to the exemplary embodiment, the granulated product according to the exemplary embodiment described above can be produced. However, the granulated product according to the exemplary embodiment described above is not necessarily produced by the method for producing a granulated product according to the exemplary embodiment. For example, in the grinding and mixing step, a granular CNT and a granular CB are used and a grinding treatment is performed on them, but an equivalent CNT or CB that has been ground may be used without performing the grinding treatment.

Grinding and Mixing Step

In the grinding and mixing step, the granular CB and the granular CNT are dry ground each to a specific particle size or smaller and are mixed together to obtain a mixture. Here, the dry grinding and the mixing may be performed in any order. (1) The granular CB and the granular CNT may be mixed after they are each dry ground, or (2) the granular CB and the granular CNT may be dry ground after they are mixed.

There are two types of grinding methods, dry grinding and wet grinding, which are properly used depending on the purpose. In the invention, dry grinding is used. In dry grinding, different grinders are used depending on the desired particle size, particle size distribution, etc. For example, (1) an impeller mill, a pin mill, a roller mill, or the like is used for medium grinding (10 mm or less), and (2) a jet mill, a ball mill, a vibrating ball mill, a planetary mill, or the like is used for fine grinding (several tens of μm or less).

In general, dry grinding treatment is performed in the atmosphere, and thus treated products are often oxidized. For example, the physical properties of a CNT after being placed in a steel ball mill with an inner capacity of about 2 liters so as to account for about 60% of the capacity and treated for 48 hours were as follows: the powder resistivity (resistivity of the CNT itself) increased from $8.2 \times 10^{-2}$ Ω·cm to $5.1 \times 10^{-1}$ Ω·cm, and the pH decreased from 8.5 to 6.9. This is probably because fibers of the CNT were cut and reactive sites were generated there, that is, so-called air oxidation occurred. Thus, in the invention, to avoid oxidation of materials, the fine grinding or ultrafine grinding treatment using a jet mill, a vibrating ball mill, or the like is carried out in an inert atmosphere. Nitrogen gas, argon gas, carbonic acid gas, or the like is used as inert gas, but argon gas is used in the exemplary embodiment.

Among manufacturers of grinders, manufacturers of jet mill-type grinders include SEISHIN ENTERPRISE Co., Ltd., Aishin Nano Technologies CO., LTD., and EARTHTECHNICA CO., LTD. Manufacturers of pin mills include MAKINO MFG CO., LTD., NISHIMURA MACHINE WORKS CO., LTD., and Hosokawa Micron Corporation. Manufacturers of impeller mills include SEISHIN ENTERPRISE Co., Ltd. and EARTHTECHNICA CO., LTD.

Particle Size Measurement of Ground Product

The particle size distribution of the CNT and the CB is determined by a laser diffraction/scattering method specified in ISO 13320. As a measuring instrument, a Laser Micronsizer LMS-3000 (manufactured by SEISHIN ENTERPRISE Co., Ltd.) was used. The measurable range of this instrument is 0.01 to 3,500 μm. An aqueous dispersion medium was prepared by adding 0.05 g of polyoxyethylene alkyl ether (manufactured by Kao Corporation, trade name: EMULGEN 705) as a surfactant to 50 mL of pure water. In the measurement, 10 mg of the CB and the CNT were weighed in a vial with an inner capacity of 20 mL, and 10 mL of the aqueous dispersion medium was added, after which they were dispersed with an ultrasonic dispersion machine for about 10 minutes. The measurement was performed with the optical model of the measuring instrument set to refractive indices of 1.520 for the CB and the CNT and 1.333 for water.

The suitable particle size of the CB after grinding in terms of Median diameter D50 is in a range from 1 μm to 500 μm, preferably in a range from 10 μm to 250 μm. A particle size of larger than 500 μm leads to many aggregates and poor dispersibility. A treatment to reduce the particle size to less than 1 μm is not easy in industrial-scale production, and if such a treatment is possible, the treatment requires a long period of time and is impractical. The suitable particle size $D_{50}$ of the CNT is in a range from 10 μm to 100 μm, preferably in a range from 10 μm to 50 μm. A particle size of larger than 50 μm, as in the case of the CB, leads to the presence of many aggregates and poor dispersibility. A treatment to reduce the particle size to less than 10 μm is not preferred because it involves cutting of fibers of the CNT and results in poor conductivity. Furthermore, the particle size in the case where the CB and the CNT are blended and then ground is preferably the same as that of the CNT.

Solution Preparation Step

In the solution preparation step, a binder solution is prepared by dissolving a solvent-soluble polymer in a solvent.

The solvent-soluble polymer is as described above.

The solvent includes water, organic solvents, and mixtures thereof, among which water is most preferred.

The concentration of the solvent-soluble polymer in the binder solution is preferably in a range from 1 mass % to 10 mass %, more preferably in a range from 2 mass % to 5 mass %.

When the concentration of the solvent-soluble polymer is equal to or higher than the above lower limit, the solvent-soluble polymer can be impregnated into the carbon materials more efficiently. If the concentration of the solvent-soluble polymer exceeds the above upper limit, the solvent-soluble polymer does not sufficiently permeate the carbon materials, and the air present on the surface or in pores, which is detrimental to conductive performance, is less effectively expelled, resulting in the tendency to cause a decrease in conductivity.

When the solvent-soluble polymer is added at a lowest possible concentration, the solvent-soluble polymer more readily permeates into voids in the carbon materials, thus enabling uniform coating over the entire carbon materials. Adding a surfactant to the binder solution allows the binder solution to readily permeate the carbon materials.

Granulated Product Preparation Step

In the granulated product preparation step, mixing is performed while the binder solution is added portionwise to the mixture of the CB and the CNT to obtain a carbon material granulated product.

Mixers used here can be broadly classified into batch-type mixers and continuous-type mixers. Typical examples of batch-type mixers include Henschel-type stirring mixers and batch-type Loedige mixers. Examples of continuous-type mixers include twin pin-type mixers which perform mixing by the rotation of twin screws.

Examples of Henschel-type mixers include "High Speed Mixer" series manufactured by EARTHTECHNICA CO., LTD., "SPG" series manufactured by TECHNOPAUDAL Co., Ltd., "FM mixers" manufactured by NIPPON COKE & ENGINEERING. CO., LTD., "SMB" and "SM" series manufactured by KAWATA MFG. CO., LTD., and "VG" series manufactured by POWLEX CO., LTD. Loedige mixers are available in a variety of models, from M20 to M8000D marketed by MATSUBO Corporation.

Twin pin-type mixers include "Dough Pelletizer" manufactured by Shin-Nichinan Co., Ltd.

In the granulated product preparation step, when continuous mixing is performed using, for example, a pin-type mixer, the step is as follows. Specifically, an apparatus in which a rotary body is in action is charged, through an input opening, with a predetermined amount of the powder mixture of the carbon nanotube ground to 100 μm or less and the carbon black ground to 500 μm or less, the binder solution is added through an injection opening located downstream of the input opening and mixed, and a granulated product is taken out through a discharge hole and dried in a drying step described later. The mixing performance is controlled by the residence time in the apparatus. A longer residence time provides a more spherical mixture. When a desired granulated product cannot be obtained, granulation may be performed using two pin-type mixers in series. The rotation speed of the rotary body is preferably in a range from 500 rpm to 3,000 rpm, more preferably in a range from 1,000 rpm to 2,000 rpm.

In the granulated product preparation step, when batch-type mixing is performed using, for example, a Henschel-type mixer, the step is as follows. Specifically, a predetermined amount of the powder of the carbon nanotube and the carbon black ground as in the case of continuous mixing is put in a mixer and then stirred with an impeller, the binder solution is added portionwise thereto, the solvent is added while the state of mixing is checked, and when a desired granule size is reached, a granulated product is taken out and dried in the drying step described later. The rotation speed of the impeller is preferably in a range from 300 rpm to 2,500 rpm, more preferably in a range from 500 rpm to 2,000 rpm.

After the granulated product preparation step, the step of drying the carbon material granulated product (drying step) is performed. For the drying, vacuum drying, hot air drying, or the like is used. Examples of hot air driers that can be used include vibrating/fluidized bed driers, fluidized bed driers, box-type driers, and dryer-type driers. Examples of vacuum (reduced-pressure) driers that can be used include vacuum shelf-type driers, reduced-pressure outer mixer-type driers, and box-type driers.

The drying temperature is preferably a temperature at which the solvent-soluble polymer does not degrade, and thus there exists an optimum temperature or a maximum temperature depending on the type of the solvent-soluble polymer. However, in general, the drying temperature is preferably in a range from 40 degrees C. to 200 degrees C., more preferably in a range from 50 degrees C. to 150 degrees C., and particularly preferably in a range from 60 degrees C. to 100 degrees C. The drying time depends on the drying temperature, but is typically in a range from 1 hour to 20 hours, preferably in a range from 2 hours to 10 hours.

Conductive Resin Composition

Next, a conductive resin composition according to an exemplary embodiment will be described.

The conductive resin composition according to the exemplary embodiment contains the carbon material granulated product described above and a resin.

Since the granulated product according to the exemplary embodiment can improve conductivity and mechanical properties, a very wide variety of conductive resin compositions can be produced using the granulated product according to the exemplary embodiment.

Examples of the resin include polyolefin resins, polyhalogenated olefin resins, polyester resins, polyamide resins, polyimide resins, polyether resins, polyvinyl resins, polystyrene resins, polyvinyl alcohol resins, polymethacrylate resins, polyurethane resins, polyepoxy resins, polyphenol resins, polyurea resins, and polyethersulfone resins.

Product

The carbon material granulated product according to the exemplary embodiment described above, in which the carbon materials including the carbon black and the carbon nanotube are well dispersed substantially without forming coarse aggregates, is excellent in antistatic properties and strength. Having such advantageous properties, the carbon material granulated product can provide the following products. Specifically, products such as paints, inks, coating agents, materials for resin molded articles, conductive materials, thermally conductive materials, and antistatic materials, each containing the carbon material granulated product described above, can be provided. In addition, products such as battery materials and machine parts, each including a coating film formed from a dispersion solution of the carbon material granulated product described above, can be provided.

Examples of methods for preparing a paint or an ink include adding the carbon material granulated product described above to a solvent, a resin, various additives, etc. so as to give a paint composition or an ink composition, and adding the carbon material granulated product described above to a commercial paint or ink. Examples of methods for producing a resin molded article in which the carbon materials including the carbon black and the carbon nanotube are dispersed include mixing a resin material in a molten state with the carbon material granulated product described above. The amount of the carbon material granulated product used is preferably 30 mass % or less. More than 30 mass % of the carbon material granulated product may lower various mechanical properties such as tensile strength and impact strength.

EXAMPLES

The invention will now be described specifically with reference to Examples, but these Examples are not intended to limit the invention. Unless otherwise specified, "parts" and "%" in Examples, etc. are by mass.

Provision of Materials

The following carbon materials and solvent-soluble polymers were provided.

Carbon Material

Carbon Nanotube (CNT)

Three CNTs with trade names "NC7000", "BT-1001M", and "CP-1001M" were used. These are all multi-walled CNTs, and the names of manufacturers and physical properties are shown in Table 1.

TABLE 1

| | | Physical properties | | |
|---|---|---|---|---|
| Brand | Manufacturer | Fiber diameter [nm] | Fiber length [μm] | Specific surface area [m$^2$/g] |
| NC-7000 | Nanocyl | 9.5 | 1.5 | 250 to 300 |
| BT-1001M | LG Chem. | 6 to 12 | 10 to 50 | 236 to 276 |
| CP-1001M | LG Chem. | 8 to 17 | 10 to 15 | 236 to 276 |

Carbon Black (CB)

Eight CBs, "Ketjenblack EC600JD", "Li400", "Li435", "Vulcan XC72", "DC-3501", "#3030B", "#3050B", and "#3230B jet mill ground product", were used. The names of manufacturers and physical properties are shown in Table 2.

TABLE 2

| | | Physical properties | | |
|---|---|---|---|---|
| Brand | Manufacturer | Particle size [nm] | Specific surface area [m$^2$/g] | DBP absorption [cc/100 g] |
| Ketjenblack EC600JD | Lion Specialty Chemicals Co., Ltd. | 34 | 1,270 | 495 |
| Li400 | Denka Company Limited | 48 | 39 | 140 |
| Li435 | Denka Company Limited | 23 | 133 | 220 |
| Vulcan XC-72 | CABOT | 30 | 254 | 174 |
| DC-3501 | OCI | — | 82 | 190 |
| #3030B | Mitsubishi Chemical Corporation | 55 | 32 | 130 |
| #3050B | Mitsubishi Chemical Corporation | 50 | 50 | 175 |
| #3230B jet mill ground product | Mitsubishi Chemical Corporation | 23 | 220 | 140 |

Solvent-Soluble Polymer

PVP (polyvinylpyrrolidone): molecular weight, 10,000; trade name "PITZCOL K-30", manufactured by DKS Co. Ltd.; solid content, 95% or more PEO (polyethylene oxide): molecular weight, 100,000 to 200,000; trade name "ALKOX R-150", manufactured by Meisei Chemical Works, Ltd.

PVA (polyvinyl alcohol): trade name "Gohsenol GL-05", manufactured by Mitsubishi Chemical Corporation; degree of saponification (mol %), 86.5 to 89.0

Solvent

Water: ion-exchanged water

Test Example 1 (Examination of Grinding Treatment and Dispersibility)

A CNT (BT1001M manufactured by LG Chem., a granulated product with a diameter of about 5 mm obtained using a tablet machine) was subjected to a grinding treatment at a speed of 0.8 kg/h in an argon gas atmosphere using a jet mill FS-4 manufactured by SEISHIN ENTERPRISE Co., Ltd. The average particle size of the resulting CNT was 21 μm.

A CB (DC-3501 manufactured by OCI, a granulated product with a diameter of about 1 mm) was subjected to a grinding treatment at a speed of 1 kg/h in an argon gas atmosphere using a Pin Mill DD-2-3.7 manufactured by SEISHIN ENTERPRISE Co., Ltd. The average particle size of the resulting CB was 35 μm.

The CB and the CNT before and after the grinding were each blended in an amount of 2% in a polypropylene resin (J229E manufactured by Prime Polymer Co., Ltd.) and kneaded at 210 degrees C. for 4 minutes using a Plastomill to produce resin compositions.

The dispersibility was evaluated by melt pressing each resin composition to prepare a thin section and observing the thin section using transmitted light under a microscope (magnification: ×50 and ×200). The results obtained are shown in FIG. 1.

The results shown in FIG. 1 reveal that the dispersibility was improved by grinding both the CB and the CNT. In particular, the dispersibility of the CNT was improved.

Test Example 2 (Examination of Whether Oxidation Occurs During Grinding)

Using #3030B and #3050B manufactured by Mitsubishi Chemical Corporation as CBs and an SK Jet-O-Mill JOM-0101 manufactured by SEISHIN ENTERPRISE Co., Ltd., each CB was put in at a speed of 1 kg/h, and subjected to a grinding treatment. Air and argon gas were used as compression fluids and allowed to flow at 1 m$^3$/min. The average ground particle size after the treatment was 15 to 30 µm. The pH values before and after the grinding are as shown in Table 3. In the air atmosphere, the pH decreased, showing that mild oxidation occurred. In the argon gas, there was no change in pH.

TABLE 3

| | Grinding atmosphere | | |
|---|---|---|---|
| | Air | Argon | pH before grinding |
| #3030B | 6.1 | 7.2 | 7.2 |
| #3050B | 6.2 | 7.4 | 7.5 |

Test Example 3 (Examination of Mixing Ratio of CB and CNT) The mixing ratio of a CB and a CNT was evaluated. Using a Plastomill, five mixtures of a polypropylene resin (J229E manufactured by Prime Polymer Co., Ltd.) with a CB (jet mill ground product of #3230B) and a CNT (NC-7000) at ratios of 100/0, 80/20, 70/30, 60/40, and 0/100 were each kneaded at 210 degrees C. and 100 rpm for 4 minutes to produce resin compositions. The total content of the CB and the CNT in each resin composition was 2%, except that the CNT 100% product was blended in an amount of 1%.

The resin compositions were melt pressed to prepare thin sections. These thin sections were observed using transmitted light under a microscope (magnification: ×50 and ×200) to evaluate dispersibility. The volume resistivity of the resin compositions was also measured. The results obtained are shown in FIG. 2.

Figure 2:
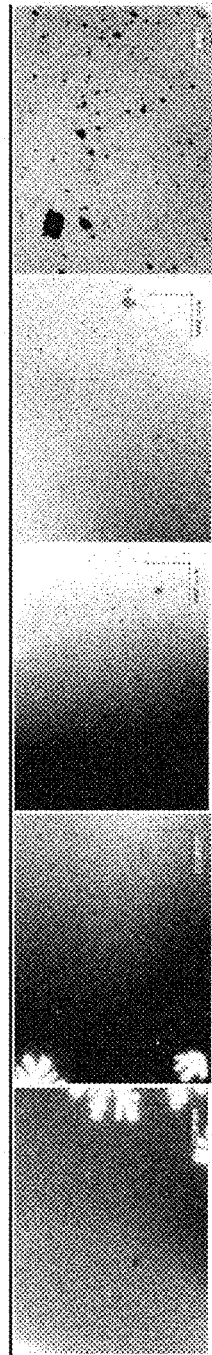
FIG. 2 shows images showing the dispersibility of resin compositions at varied CB/CNT mixing ratios obtained in Test Example 3.

The results shown in FIG. 2 demonstrate that as the proportion of the carbon nanotube in the carbon material increases, the dispersibility decreases. It has also been demonstrated that mixing the carbon black and the carbon nanotube can achieve a significant decrease in volume resistivity (good conductivity).

Test Example 4 (Examination of Solvent-Soluble Polymer)

In this Test Example, NC7000 was used as a CNT, and DC-3501 was used as a CB. In Test Example 4-1, the CB and the CNT were put in a Loedige mixer of N20L model at 6:4 (total amount: 1.2 kg), then granulated for 15 to 20 minutes with water added while performing mixing by stirring at a blade rotation speed of 260 rpm and a chopper rotation speed of 6,000 rpm, and then dried in a vacuum drier set to 70 degrees C. In Test Example 4-2 to Test Example 4-5, the CB and the CNT were put in a Loedige mixer at 6:4, then granulated with a binder solution added while performing mixing by stirring, and dried. The blending ratios of the solvent-soluble polymer, etc. are as shown in Table 4.

TABLE 4

| | CNT | CB | Solvent-soluble polymer | | Solvent (water) | Remarks |
|---|---|---|---|---|---|---|
| Test Example 4-1 | 40 | 60 | — | | 300 | Granulated product with water alone |
| Test Example 4-2 | 40 | 60 | PEO | 5 | 300 | Granulated product with polymer impregnated |
| Test Example 4-3 | 40 | 60 | PEO | 10 | 300 | |
| Test Example 4-4 | 40 | 60 | PVA | 10 | 300 | |
| Test Example 4-5 | 40 | 60 | PVP | 10 | 300 | |

Next, mixtures of a polycarbonate resin (Panlite L-1225WP manufactured by TEIJIN LIMITED) blended with 1% of the granulated products shown in Table 4, etc. were kneaded at 210 degrees C. and 150 rpm for 4 minutes using a Labo Plastomill to produce resin compositions. The resin compositions were then melt pressed to prepare thin sections. These thin sections were observed using transmitted light under a microscope (magnification: ×50 and ×200) to evaluate dispersibility. The results obtained are shown in FIG. 3.

The results shown in FIG. 3 reveal that the dispersibility varies depending on the type of the solvent-soluble polymer and that a glycol polymer such as polyethylene oxide is suitable for use as the solvent-soluble polymer.

Test Example 5 (Examination of Scattering Properties)

First, a carbon material and materials for binder solutions shown in Table 5 below were provided. In Test Example 5-2 to Test Example 5-5, after a CNT (NC7000) was put in a Loedige mixer (manufactured by Loedige Industries), a binder solution was added with stirring and mixed. Drying was performed in a vacuum drier set to 70 degrees C. In Test Example 5-6, after the CNT was put in a Loedige mixer (manufactured by Loedige Industries), water was added with stirring and mixed, and the mixture was dried to obtain a granulated product of the CNT alone.

TABLE 5

| | Test Example 5-1 | | Test Example 5-2 | | Test Example 5-3 | | Test Example 5-4 | | Test Example 5-5 | | Test Example 5-6 | |
|---|---|---|---|---|---|---|---|---|---|---|---|---|
| | Material | Parts | Material | Parts | Material | Parts | Material | Parts | Material | Parts | Material | Parts |
| CNT | NC7000 | 100 | NC7000 | 100 | NC7000 | 100 | NC7000 | 30 | NC7000 | 30 | NC7000 | 100 |
| Solvent-soluble polymer | — | — | PEO | 5 | PEO | 10 | PVA | 10 | PVP | 10 | — | — |
| Solvent | — | — | Water | 1,000 | Water | 1,000 | Water | 1,000 | Water | 1,000 | Water | 1,000 |

Next, for the evaluation of scattering properties, 95 g of ABS resin was wound around a two roll mill (hereinafter referred to as a 2RM) heated to 175 degrees C., and each carbon material granulated product or the carbon nanotube in an amount of 5 g was dropped thereon portionwise from above. The dropping was stopped when the carbon nanotube alone or each carbon nanotube/solvent-soluble polymer granulated product was completely blended with the resin. The carbon nanotube alone or each carbon nanotube/solvent-soluble polymer mixture that scattered around was entirely recovered, and the degree of scattering was calculated from the value of scattering amount/input amount. The hardness of each granulated product was determined in accordance with JIS K 6219-3. Specifically, 20 particles having a particle size of 1 mm were measured, and its average was employed. The results obtained are shown in Table 6.

2 for basic physical properties). The CB and the CNT were blended at 7:3, and the amount of the solvent-soluble polymer was 3% (an amount such that the mixed granulated product did not scatter) relative to the total amount of the CB and the CNT.

The granulation was performed using a Loedige mixer in such a manner that the CB was put in, and while the CB was stirred, the CNT was added thereto, and PEO dissolved in water was added portionwise while mixing them. Drying was performed in a vacuum drier set to 70 degrees C.

TABLE 6

|  |  | Test Example 5-1 | Test Example 5-2 | Test Example 5-3 | Test Example 5-4 | Test Example 5-5 | Test Example 5-6 |
|---|---|---|---|---|---|---|---|
| Granulation |  | No |  |  | Yes |  |  |
| CNT |  | NC-7000 | NC7000 with 5% PEO | NC 7000 with 10% PEO | NC7000 with 10% PVA | NC7000 with 10% PVP | Granulated product of NC7000 with water alone |
| Scattering properties at 2RM | % | 6.8 | 0.8 | 0.5 | 2.8 | 2.5 | 5.6 |
| Hardness of granulated product | g/granule | — | 11 | 15 | 25 | 23 | 12 |

The results shown in Table 6 demonstrate that the impregnation of a solvent-soluble polymer into the carbon nanotube can significantly reduce scattering properties. It has also been revealed that the scattering properties and the hardness of the granulated product vary depending on the type of the solvent-soluble polymer. It has been revealed that a glycol polymer such as polyethylene oxide is suitable for use as the solvent-soluble polymer.

Next, using a Labo Plastomill, four mixtures of a polycarbonate (hereinafter also referred to as PC) resin (Panlite L-1225WP manufactured by TEIJIN LIMITED) with carbon materials in amounts of 1.0%, 1.5%, 1.7%, and 2% were each kneaded at 280 degrees C. and 100 rpm for 4 minutes to produce resin compositions. The volume resistivity of the resin compositions was then measured. The results obtained are shown in Table 7 and FIG. 4.

| Blending amount [%] | Ketjenblack 600JD | #3030B and CNT 7:3 | Li400 and CNT 7:3 | Li435 and CNT 7:3 | Vulcan XC-72 and CNT 7:3 | DC-3501 and CNT 7:3 |
|---|---|---|---|---|---|---|
| 1 | $1.0 \times 10^{14}$ | $1.0 \times 10^{14}$ | $1.0 \times 10^{12}$ | $1.0 \times 10^{10}$ | $1.0 \times 10^{11}$ | $1.0 \times 10^{13}$ |
| 1.5 | $1.0 \times 10^{8}$ | $1.5 \times 10^{9}$ | $6.0 \times 10^{4}$ | $3.0 \times 10^{3}$ | $8.0 \times 10^{5}$ | $5.0 \times 10^{6}$ |
| 1.7 | $8.0 \times 10^{5}$ | $7.2 \times 10^{7}$ | $2.0 \times 10^{3}$ | $1.0 \times 10^{3}$ | $2.0 \times 10^{4}$ | $1.0 \times 10^{5}$ |
| 2 | $7.0 \times 10^{3}$ | $4.0 \times 10^{4}$ | $3.0 \times 10^{2}$ | $3.0 \times 10^{2}$ | $7.0 \times 10^{2}$ | $2.0 \times 10^{3}$ |
| Amount of hydrogen of CB at 1,500 degrees C. [mg/g] | 2.4 | 2.4 | 0.32 | 0.25 | 1.42 | 1.52 |

Test Example 6 (Examination of Volume Resistivity of Carbon Material Granulated Product)

Granulated products were produced by adding a solvent-soluble polymer (polyethylene oxide (PEO) was used here) to a CB and a CNT, and their volume resistivity (VR) was examined.

The CNT used was obtained by grinding BT1001M to 15 μm with a jet mill. The CB was put in a Pin Mill DD-2-3.7 manufactured by SEISHIN ENTERPRISE Co., Ltd. in an argon gas atmosphere at a speed of 1 kg/h and subjected to a grinding treatment. The average ground particle size after the treatment was 40 μm. Five CB brands, #3030B, DC-3501, and Vulcan XC-72 (which are furnace-type CBs) and acetylene blacks Li400 and Li435, were used (see Table FIG. 3 of Non-Patent Literature 1 shows that, as described above, Ketjenblack EC600JD can achieve the desired resistivity with an overwhelmingly small amount and provides high conductivity, and an acetylene black such as Li435 is ranked in the worst category.

Figure 4:
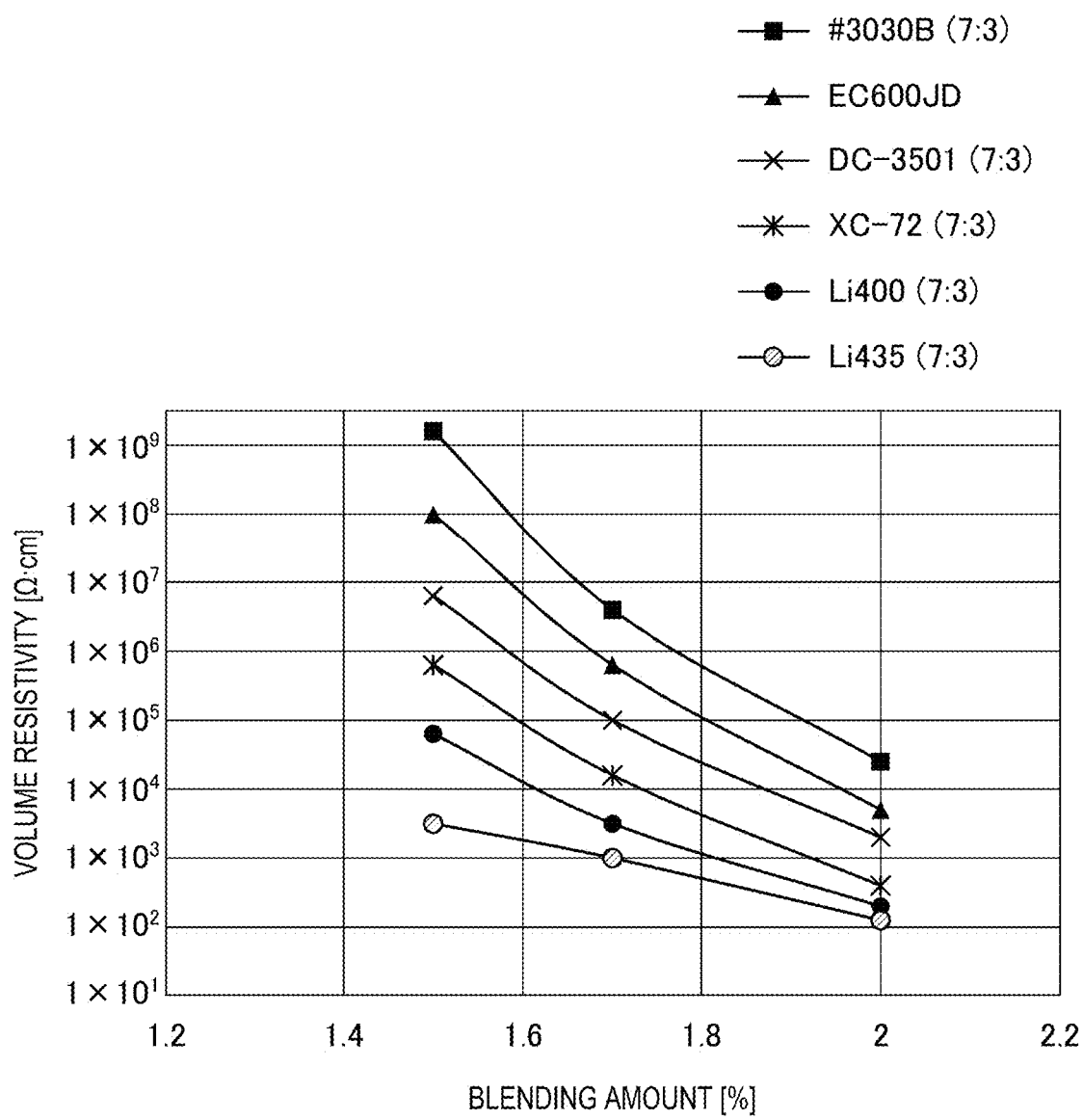
FIG. 4 is a graph showing the relationship between the blending amount and the resistivity of resin compositions obtained in Test Example 6 in which carbon material granulated products with varied CBs are blended.

By contrast, the results in FIG. 4 show that Li435 and Li400 acetylene blacks are most superior in the form of a carbon granulated product in which a CB and a CNT are impregnated with a solvent-soluble polymer, while Ketjenblack EC600JD blended alone is considerably worse than Li435.

It has been found that the reason why the conductive positions of the CB/CNT mixed granulated products are different from that in the case of the CB alone cannot be adequately explained by the above-described "quality influencing conductivity".

Test Example 7 (Relationship between Amount of Hydrogen upon Heating CB at 1,500 Degrees C. and Volume Resistivity)

The measurement of the amount of hydrogen in CBs was performed with reference to Surface studies of carbon: Acidic oxides on spheron 6 (Carbon Volume 11, Issue 6, December 1973, Pages 649-654). Specifically, about 0.5 g of a dried CB was accurately weighed and then placed in a heat-resistant test tube (alumina tube), and after the pressure was reduced to a medium vacuum ($10^2$ Pa to $10^{-2}$ Pa), the reduced-pressure system was closed, and the CB was held and heated at 1,500 degrees C. for 30 minutes in an electric furnace to decompose and volatilize oxygen compounds or hydrogen compounds present in the CB. The volatilized components were collected through a metering suction pump into a gas collection pipe with a certain volume. The amount of gas was determined from the pressure and temperature, and hydrogen gas desorbed from the CB surface was also quantitatively determined by gas chromatography. In this experiment, values converted to the amount of hydrogen per gram of a CB were used. The results obtained are also shown in Table 7. The relationship between the amount of hydrogen at 1,500 degrees C. of the carbon blacks and the volume resistivity at 1.5% blending shown in Table 7 is shown in FIG. 5.

Figure 5:
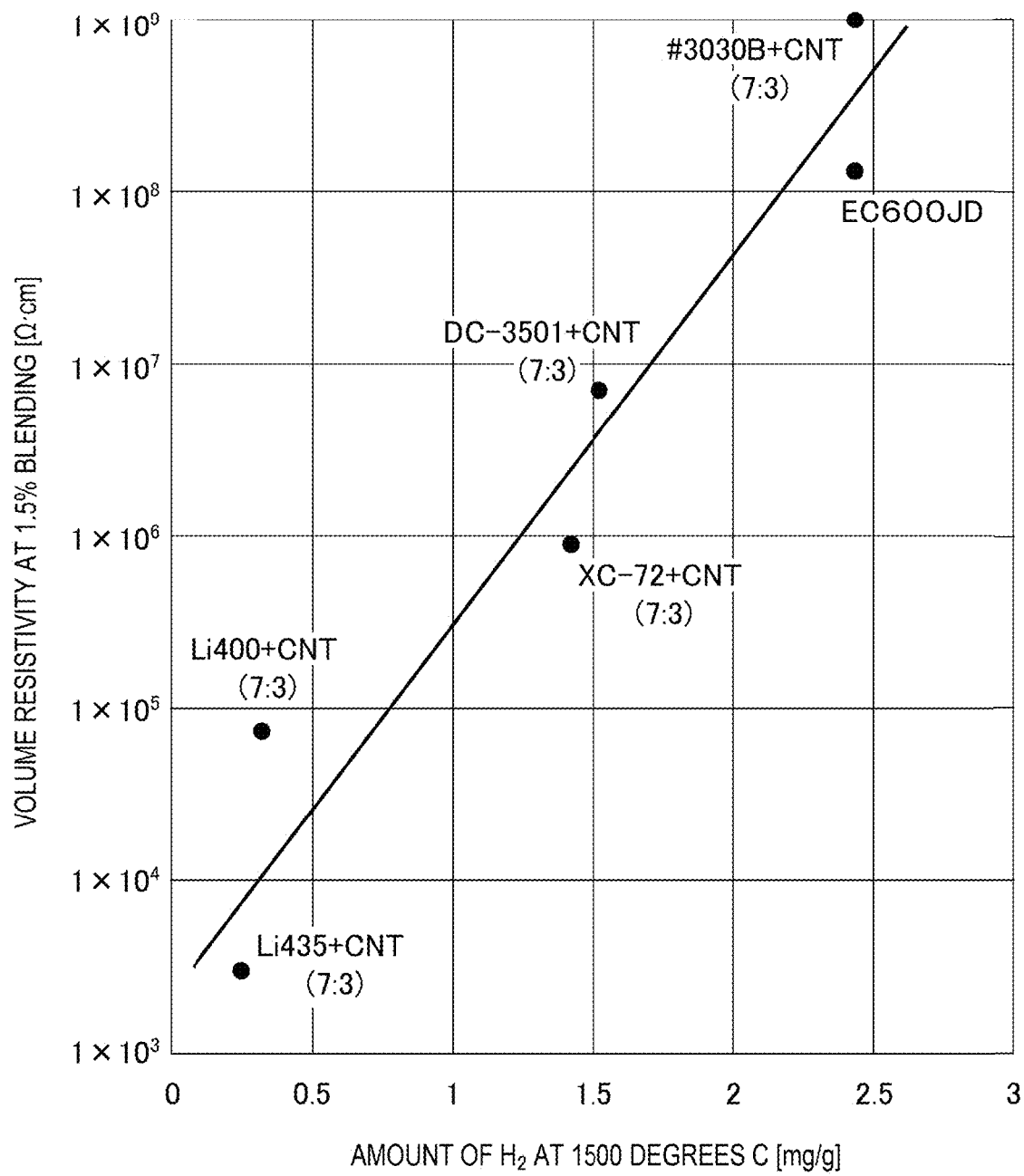
FIG. 5 is a graph showing the relationship between the volume resistivity at 1.5% blending and the amount of hydrogen upon heating CBs at 1,500 degrees C. of carbon material granulated products obtained in Test Example 7.

The results shown in FIG. 5 demonstrate that the smaller the amount of hydrogen at 1,500 degrees C. of the carbon blacks, the lower the volume resistivity can be. From this it follows that when a conductive CB alone is blended in a resin, Ketjenblack provides highest conductivity, followed by furnace blacks and acetylene blacks. However, it has been found that in the case of mixed granulated products obtained by mixing a conductive carbon black and a carbon nanotube and performing polymer impregnation during granulation, furnace blacks and acetylene blacks provide higher conductivity than that of the resin obtained by using Ketjenblack alone.

Figure 6:
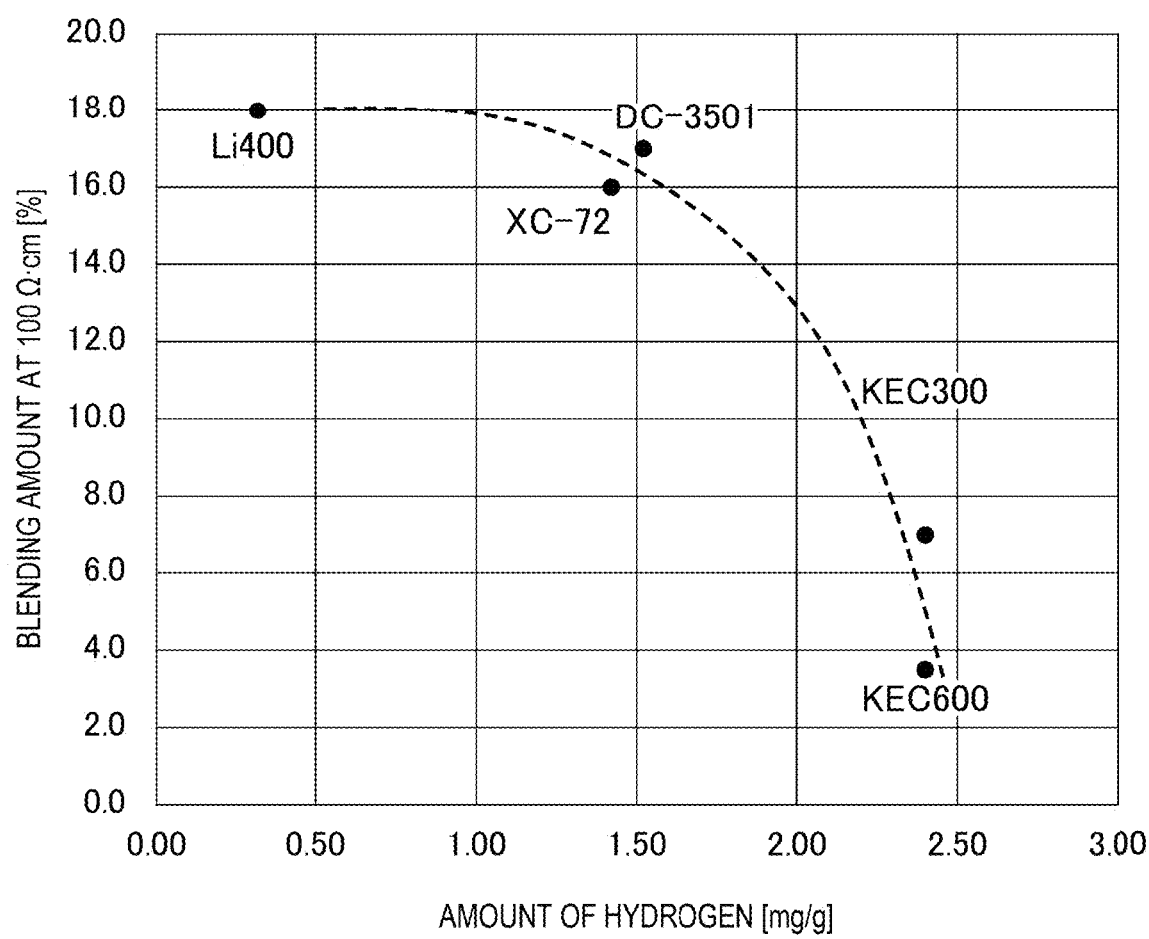
FIG. 6 is a graph showing the relationship between the CB blending amount required to provide a resin composition with 100 Ω·cm, as calculated from FIG. 3 of Non-Patent Literature 1, and the amount of hydrogen upon heating CBs at 1,500 degrees C.

To further clarify the above, the CB blending amount required to achieve 100 Ω·cm was calculated from FIG. 3 of Non-Patent Literature 1 as a representative example of blending of a carbon black alone in a resin, and its relationship with the amount of hydrogen at 1,500 degrees C. of each CB is shown in FIG. 6. FIG. 6 indicates that the CBs shown in FIG. 3 of Non-Patent Literature 1 tend to provide higher conductivity as the amount of hydrogen increases.

Meanwhile, the inventors have found that in the system of the invention in which a CNT and a CB are mixed and impregnated with a solvent-soluble polymer, the volume resistivity does not show the same tendency as when the CB alone is blended in a resin, and the relationship with the amount of hydrogen is almost the exact opposite, that is, the conductivity in the case where a CNT and a CB are mixed cannot be assumed from the conductivity in the case of the CB alone.

In addition, it has been found that in a granulated product in which a mixture of a CNT and a CB is impregnated with a polymer, the amount of hydrogen on a CB surface determined by performing heating at 1,500 degrees C. is more greatly involved than the above-mentioned characteristics generally said to be desirable for conductive carbon blacks (small particle size, long structure, etc.). It has also been found that a slight difference in the amount of hydrogen at 1,500 degrees C. may result in a difference in volume resistivity of about six orders of magnitude when blended in a resin. In other words, it has been found that the conductivity of a granulated product in which a mixture of a CNT and a CB is impregnated with a polymer is more closely related to the amount of hydrogen than to properties such as specific surface area, structure, fiber diameter, and length.

Examples 1 to 4 and Comparative Examples 1 to 5 (Production of Carbon Material Granulated Product)

In Examples 1 to 4 and Comparative Examples 1 to 5, carbon materials and materials for binder solutions shown in Tables 8 and 9 below were first provided. In preparing a binder solution, specifically, 120 g of a solvent-soluble polymer was added to 3,480 g of water, and mixing was performed at 3,000 rpm for 5 minutes using a high-speed homomixer (LZB14-HM-1 manufactured by CHUORIKA CO., LTD.) to obtain the binder solution.

Next, in Examples 1 to 4, carbon material granulated products were produced with compositions shown in Tables 8 and 9 below. Specifically, 840 g of a carbon black ground (particle size after grinding: 40 μm) with a pin mill (DD-2-3.7) manufactured by SEISHIN ENTERPRISE Co., Ltd. and 360 g of a carbon nanotube finely ground (particle size after grinding: 15 μm) with a jet mill (FS-4) manufactured by SEISHIN ENTERPRISE Co., Ltd. were put in a Loedige mixer (manufactured by Loedige Industries, M20 model, 20 L capacity). Under stirring at 250 rpm, 3,600 g of an aqueous polymer solution was sprayed from an upper input hole and mixed for 15 minutes, after which the spraying of the aqueous solution was stopped, and granulation was performed for 15 minutes with stirring to obtain a wet carbon material granulated product. Thereafter, drying was performed with a hot air drier to obtain a carbon material granulated product.

In Comparative Examples 1 to 5, carbon material granulated products were produced in the same manner as in Examples 1 to 4 with compositions shown in Tables 8 and 9 below.

TABLE 8

| | Example 1 | | Example 2 | | Comparative Example 1 | | Comparative Example 2 | |
|---|---|---|---|---|---|---|---|---|
| | Material | Parts | Material | Parts | Material | Parts | Material | Parts |
| CNT | CP1001M | 30 | CP1001M | 30 | — | — | CP1001M | 100 |
| CB | Li435 | 70 | XC72 | 70 | KEC600JD | 100 | — | — |
| Solvent-soluble polymer | PEO | 10 | PEO | 10 | — | — | — | — |
| Solvent | Water | 300 | Water | 300 | Water | 300 | Water | 300 |

TABLE 9

|  | Example 3 | | Example 4 | | Comparative Example 3 | | Comparative Example 4 | | Comparative Example 5 | |
|---|---|---|---|---|---|---|---|---|---|---|
|  | Material | Parts | Material | Parts | Material | Parts | Material | Parts | Material | Parts |
| CNT | BT1001M | 30 | CP1001M | 30 | BT100M | 30 | CP1001M | 30 | CP1001M | 30 |
| CB | XC72 | 70 | DC-3501 | 70 | XC72 | 70 | DC-3501 | 70 | Li435 | 70 |
| Solvent-soluble polymer | PEO | 10 | PEO | 10 | — | — | — | — | — | — |
| Solvent | Water | 300 | Water | 300 | Water | 300 | Water | 300 | Water | 300 |

Production of Conductive Resin Composition Using Carbon Material Granulated Product and Evaluation The carbon material granulated products having the compositions shown in Tables 8 and 9 were used to produce conductive resin compositions. Specifically, a polycarbonate resin (Panlite L-1225WP manufactured by TEIJIN LIMITED) and each carbon material granulated product were put in a mixer (Super Mixer manufactured by KAWATA MFG. CO., LTD.) and mixed at 25 degrees C. for 3 minutes to obtain a resin composition including the resin and the carbon material. The resin composition was put in a twin-screw extruder (TEX series manufactured by Japan Steel Works, LTD.) set to 280 degrees C., and after melt kneading, a pellet-shaped conductive resin composition was obtained using a pelletizer (SCF-100 manufactured by ISUZU KAKOKI Co., Ltd.). In Examples 1 to 4 and Comparative Examples 1 and 3 to 5, 5% of the carbon material granulated product or carbon material was blended with 95% of the polycarbonate resin. In Comparative Example 2, 3% of the carbon nanotube was blended with 97% of the polycarbonate resin.

To evaluate mechanical properties, injection was performed using an injection molding machine (J100E-D manufactured by Japan Steel Works, LTD.) at a cylinder temperature of 320 degrees C. and a mold temperature of 120 degrees C. to obtain evaluation samples.

The conductive resin compositions were then evaluated for surface resistivity, volume resistivity, fluidity (hereinafter also referred to as MFR), tensile strength, tensile elongation, flexural strength, flexural modulus, and impact strength. The results obtained are shown in Tables 10 and 11.

TABLE 10

|  |  | Comparative Example 1 | Example 1 | Comparative Example 5 | Example 2 | Comparative Example 2 |
|---|---|---|---|---|---|---|
| Carbon nanotube |  | — | CP1001M: 30 parts | CP1001M: 30 parts | CP1001M: 30 parts | CP1001M |
| Carbon black |  | KEC600JD | Li435: 70 parts | Li435: 70 parts | XC72: 70 parts | — |
| Solvent-soluble polymer |  | — | PEO: 10 parts | — | PEO: 10 parts | — |
| Volume resistivity | Ω · cm | $6.7 \times 10^4$ | $2.8 \times 10^4$ | $1.3 \times 10^5$ | $6.8 \times 10^5$ | $7.3 \times 10^3$ |
| MFR | g/10 min | 26 | 36 | 22 | 28 | 23 |
| Impact strength | J/m | 54 | 92 | 98 | 106 | 107 |
| Flexural strength | MPa | 98 | 96 | 96 | 97 | 94 |
| Flexural modulus | MPa | 2,563 | 2,508 | 2530 | 2,537 | 2,491 |
| Tensile strength | MPa | 63 | 62 | 55 | 64 | 64 |
| Tensile elongation | % | 30 | 45 | 43 | 54 | 30 |

TABLE 11

|  |  |  | Comparative Example 3 | Example 3 | Comparative Example 4 | Example 4 |
|---|---|---|---|---|---|---|
| Carbon nanotube |  |  | BT1001M: 30 parts | | CP1001M: 30 parts | |
| Carbon black |  |  | VulcanXC72: 70 parts | | DC-3501: 70 parts | |
| Solvent-soluble polymer |  |  | Absent | PEO: 10 parts | Absent | PEO: 10 parts |
| Conductivity | Surface resistivity | Ω/□ | $1.7 \times 10^6$ | $6.8 \times 10^4$ | $3.5 \times 10^6$ | $1.8 \times 10^4$ |
|  | Volume resistivity | Ω · cm | $6.8 \times 10^5$ | $3.6 \times 10^4$ | $7.3 \times 10^5$ | $5.0 \times 10^3$ |
| Fluidity | MFR | g/10 min | 27.6 | 53.1 | 29.6 | 42.4 |
| Tensile test | Tensile strength | MPa | 64.1 | 57.9 | 60.2 | 67.7 |
|  | Tensile elongation | % | 53.7 | — | 55.7 | 42.1 |
| Flexural test | Flexural modulus | MPa | 2,537 | 2,575 | 2,546 | 2,556 |
|  | Flexural strength | MPa | 96.8 | 99.2 | 97.1 | 100.2 |
| Impact test | Impact strength | J/m | 106.2 | 83.7 | 99.3 | 92 |

The above evaluation results show that compared to the resin composition obtained using Ketjenblack alone, the mixture of an acetylene black and a CNT has been improved in MFR, impact strength, and tensile elongation. The mixture of a furnace black and a CNT has been improved in impact strength and tensile elongation. Comparing the physical properties of the resin composition obtained using Ketjenblack alone and the resin composition obtained using a CNT alone, the impact strength of the CNT is about double, indicating that the characteristics of the CNT, which is fibrous carbon, are exhibited. The sample of the invention in which the acetylene black or the furnace black is mixed with 30% of the CNT has been found to have an impact strength substantially the same as that of the CNT and a tensile elongation superior to that of the CNT. That is, it has been found that by producing a granulated material in which a specific CB is mixed with 30% of a CNT and about 10% of a polymer, impact strength and tensile elongation, which have been drawbacks of the resin composition obtained using Ketjenblack alone, are significantly improved to a level superior to that of the CNT.

Figure 7:
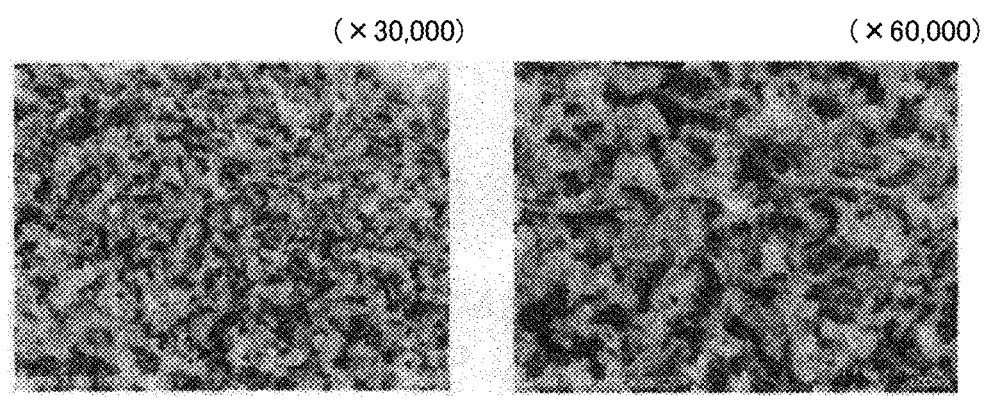
FIG. 7 shows electron micrographs each showing a carbon black and a carbon nanotube mixed together.

Furthermore, Examples 3 and 4 show that the solvent-soluble polymer impregnation has improved VR and MFR. Particularly for VR, the above evaluation results are results in the case where 5% of the carbon material granulated product is blended in 95% of the resin. This means that the carbon material content of the carbon material granulated product, excluding the polymer, is 4.5%, that is, the carbon content is 0.5% lower than when the solvent-soluble polymer is not added. Nevertheless, equivalent or better VR is exhibited, indicating that the impregnation of the solvent-soluble polymer greatly contributes to improving the conductivity of the CB/CNT mixtures. The reason for the improvement in VR and MFR is as follows. The CNT fibers cover the CB structure like a covering net (see FIG. 7), and it can also be seen that the CB and CNT structure has many voids. The surfaces of the CB and the CNT, particularly the surface of the CNT, is highly crystallized. The contact angle of the CNT with pure water is 98°, which is higher than those of standard graphite materials, 50° to 65°, indicating that the CNT is a hydrophobic material. Thus, the CNT generally has poor compatibility with the base resin. On the other hand, the solvent-soluble polymer dissolved in the solvent is considered to be first impregnated into the CB surface and also into the CNT surface substantially integrated with the CB. Furthermore, it is believed that the polymer penetrates not only the interface but also many voids (pores) formed by the skeletons of the CB and the CNT to expel the air present there. It goes without saying that the reduction of air, which is an insulator, in the CB and CNT dispersion system leads to improved conductivity. One possible reason for the improvement in MFR is an improvement in the affinity with the base resin due to the polymer impregnation, but the main reason is that the same VR is achieved with a smaller blending amount. That is, the inventors believe that this is because the compositions have a 10% lower carbon content.

INDUSTRIAL APPLICABILITY

The carbon material granulated product of the invention is useful as a constituent material for paints, inks, resin molded articles, etc. that exhibit characteristics such as high conductivity and high thermal conductivity, and is also suitable for various applications such as battery materials, electronic component trays, covers for IC chips, electromagnetic shields, automotive components, and robot components.

The invention claimed is:

1. A method for producing a carbon material granulated product, comprising:
   dry grinding and mixing a granular carbon black and a granular carbon nanotube so that the carbon black has a particle size $D_{50}$, as determined by a laser diffraction/scattering method specified in ISO 13320, of 10 μm or more and 250 μm or less and the carbon nanotube has a particle size $D_{50}$, as determined by the laser diffraction/scattering method specified in ISO 13320, of 10 μm or more and 50 μm or less to obtain a mixture;
   preparing a binder solution by dissolving a solvent-soluble polymer in a solvent; and
   performing mixing and granulation while adding the binder solution to the mixture to obtain a carbon material granulated product; wherein
   the dry grinding for the granular carbon black is performed using at least one selected from the group consisting of an impeller mill, a pin mill, and a roller mill,
   the solvent-soluble polymer is at least one selected from the group consisting of ether polymers, vinyl polymers, amine polymers, cellulose polymers, and starch polymers, and
   a content of the solvent-soluble polymer impregnated into the carbon black and the carbon nanotube is in a range from 1 part by mass to 15 parts by mass relative to a total content of the carbon black and the carbon nanotube taken as 100 parts by mass.

2. The method according to claim 1, wherein a concentration of the solvent-soluble polymer in the binder solution is in a range of from 1 mass % to 10 mass %.

* * * * *